:::
United States Patent Office 3,185,673
Patented May 25, 1965

3,185,673
PROCESS OF CURING ELASTOMERIC MATERIALS
Charles Edwin Kendall, Coleshill, Douglas Wynne Huke, Sutton Coldfield, and Douglas David Callander, Birmingham, England, assignors to Dunlop Rubber Company Limited, London, England, a company of Great Britain
No Drawing. Filed Jan. 17, 1962, Ser. No. 166,938
Claims priority, application Great Britain, Feb. 2, 1961, 3,912/61
6 Claims. (Cl. 260—79.5)

This invention relates to the curing of elastomeric materials and is particularly concerned with the curing of synthetic rubbers. It is an improvement in or modification of the invention described and claimed in our United Kingdom Patent Specification No. 950,964.

In our co-pending United Kingdom Patent Specification No. 950,964, there is described and claimed a process for the production of a cured elastomer from one or more of the following synthetic elastomers, viz rubberlike butadiene/styrene and butadiene/acrylonitrile copolymers, cis- and trans-polybutadiene, transpolyisoprene, copolymers of butadiene with unsaturated ketones or with acrylates or substituted acrylates, polychlorobutadiene, chlorosulphonated polyethylenes and rubber-like chlorine-containing copolymers such as copolymers of vinyl chloride with ethylene or propylene or both, wherein sulphur is used as a curing agent and an aliphatic amine as accelerator.

The aliphatic amines, although good accelerators, tend to impart an odour to the cured elastomer and also, in some cases, have an appreciable volatility. They are liquids and often can cause irritation of the skin and therefore need to be handled carefully.

It has now been found that if the aliphatic amines are used in the form of aliphatic amine carbamates, certain advantages occur.

According to the present invention, a process for the production of a cured elastomer comprises heating one or more of the aforementioned elastomers in admixture with sulphur as a curing agent and an aliphatic amine carbamate as accelerator.

The aliphatic amine carbamates which can be used as accelerators can be metal salts of the amine carbamates or amine salts of the amine carbamates. Mono- and polycarbamates can be used, although the monocarbamates are preferred.

Generally, the monocarbamates, which are preferred, are those prepared from mono-amines and have the general formula,

in which $R_1$ and $R_2$ can each represent an alkyl group, a cycloalkyl group, or a heterocyclic group and in which $R_1$ can also represent a hydrogen atom, and $R_1$ and $R_2$, when taken together, contain from 6 to 40 carbon atoms. Typical examples of amine carbamates having the above-mentioned general formula are octylammonium octylcarbamate, decylammonium decylcarbamate, and tetradecylammonium tetradecylcarbamate.

The preferred mono-amines used to prepare the preferred carbamates are the primary or secondary amines having the general formula,

in which $R_1$ and $R_2$ each represent an alkyl group and wherein $R_1$ can also represent a hydrogen atom and $R_1$ and $R_2$, when taken together, contain from 6 to 40 carbon atoms. Examples of suitable amines are n-hexylamine, n-octylamine, n-octa-decylamine, di-n-butylamine, di-iso-butylamine, and di-n-hexylamine. Other amines such as N'N-diethyl-cyclohexylamine, pentamethylene tetramine and mono-, di- and triethanolamines, can be used to prepare the carbamates. A carbamate containing heterocyclic groups can be prepared from piperidine.

The amine carbamates can be prepared by reacting a solution of an amine with carbon dioxide or with a metal bicarbonate, e.g. sodium bicarbonate. Carbon dioxide can be added to the solution in gaseous or in solid form and the amine carbamate precipitates. It is not necessary to heat the reaction mixture.

The synthetic elastomers which can be effectively cured by the new process are listed above. While natural rubber and cis-polyisoprene can be cured, the reaction is considerably slower and the degree of cure obtainable is lower. One particularly useful application of the invention is in the curing of articles comprising one of the synthetic elastomers mentioned above in the form of a blend with natural rubber. This can now be carried out, using as accelerator, a mixture of one of the known accelerators (if desired in association with zinc oxide and a fatty acid) which act more effectively towards natural rubber, and one of the aliphatic amine carbamates which acts more effectively towards the synthetic rubber. The proportion of each accelerator in the mixture is adjusted so that the natural and synthetic elastomer both cure at the same rate.

The proportion of sulphur used in the process of the invention can be such as is commonly employed in association with other curatives. Generally, the amount of sulphur is from 1 to 5 parts by weight per 100 parts of elastomer (including the weight of natural rubber in blends). The amount of amine carbamate is generally from 0.25 to 5 parts by weight per 100 parts of elastomer (including any natural rubber). Increasing the amount of aliphatic amine carbamate used decreases the amount of sulphur required for a given degree of cure.

The elastomer can be in the form of a gum-stock or can contain a substantial proportion of filler materials such as carbon black. Amounts of carbon black of from 10 to 150 parts by weight per 100 parts of elastomer can be incorporated if desired. While it is an advantage of the invention that additional curatives such as metal oxides, e.g. zinc oxide, and fatty acids, e.g. stearic acid, are not required, they can be present if desired.

The temperature to which the elastomer, in admixture with sulphur and carbamate, is heated to effect curing, is generally from 100° C. to 200° C., preferably from 130° C. to 150° C. The time required for curing depends on the temperature and on the elastomer and it is usual to heat the elastomer until the physical properties of the cured products are at an optimum.

The process according to the present invention can be used to prepare a wide variety of articles such as tyres, belts, shoe-soles, and containers which are substantially free from odour imparted thereto by the carbamate. The carbamates are advantageous in that, not only do they impart to the cured elastomer substantially less odour than the amines, but they have a lower volatility and are solids. Therefore, the carbamates can be handled much more easily than the amines and can be easily milled into the elastomer or added in an internal mixer. The carbamates are also much less irritant to the skin.

The invention is illustrated in the following examples in which all parts are by weight:

*Example I*

This example illustrates the preparation of a typical carbamate.

Decylamine (8.8 grammes) was dissolved in petroleum ether (100 ml.) and the solution added slowly to an excess of crushed solid carbon dioxide. After standing for 1 hour the crystalline solid so obtained was filtered from the ether.

The product was analysed and had the following composition:

| | Percentage Composition | | | |
|---|---|---|---|---|
| | Carbon | Nitrogen | Hydrogen | Oxygen |
| Actual | 70.8 | 7.7 | 13.2 | 8.3 |
| Calculated for decylammonium decylcarbamate | 70.4 | 7.8 | 12.9 | 8.9 |
| Calculated for decylammonium carbonate | 67.4 | 7.5 | 12.2 | 12.8 |

The analysis shows clearly that the product was, in fact, decylammonium decylcarbamate and not decylammonium carbonate.

*Example II*

This example illustrates the use of amine carbamates as accelerators for gum-stocks.

Two polymeric compositions A and B were prepared from the following ingredients:

| | A, parts | B, parts |
|---|---|---|
| Polybutadiene | 100 | |
| Butadiene/styrene copolymer | | 100 |
| Octylammonium octylcarbamate | 2 | 2 |
| Sulphur | 2 | 2 |

The butadiene/styrene copolymer used was commercially available under the name Philprene 1502. The two compositions A and B were each prepared by mixing their respective ingredients on a two-roll mill and samples of each composition were cured at 140° C. in a steam heated press for various times.

The physical properties of the cured samples were evaluated and these are given below:

| | Composition | | |
|---|---|---|---|
| | A | B | B |
| Cure time (mins.) | 60 | 40 | 60 |
| Modulus: | | | |
| (a) At 100% elongation | 8.5 | 11.4 | 12.2 |
| (b) At 300% elongation | 12.8 | 22.3 | 24.2 |
| Tensile strength | 44.0 | 21.4 | 29.0 |
| Elongation at break (percent) | 930 | 410 | 400 |

The modulus and tensile strength are each expressed in kilogrammes per square centimetre.

*Example III*

This example illustrates the use of amine carbamates in the curing of black-loaded stocks.

Four polymeric compositions C, D, E and F were prepared from the following ingredients:

| | Parts |
|---|---|
| Butadiene/styrene copolymer | 100 |
| Carbon black (high abrasion furnace) | 50 |
| Carbamate (see below) | 2 |
| Sulphur | 2 |

The ingredients were mixed on a two-roll mill and compositions C, D, E and F contained octylammonium octylcarbamate, decylammonium decylcarbamate, carbamate from a mixed secondary amine containing 8 to 18 carbon atoms and tetradecylammonium tetradecylcarbamate, respectively, as the carbamate. The secondary amine is obtainable commercially under the name Armeen 2C.

Samples of the compositions were cured at 140° C. for various lengths of time. The physical properties of the compositions were measured and are given below:

| | Composition C | | |
|---|---|---|---|
| Cure time (mins.) | 20 | 40 | 60 |
| Modulus: | | | |
| (a) At 100% elongation | 22.2 | 25.1 | 27.9 |
| (b) At 300% elongation | 127.6 | 164 | 160 |
| Tensile strength | 232 | 233 | 248 |
| Elongation at break (percent) | 500 | 420 | 440 |

| | Composition | | |
|---|---|---|---|
| | D | E | F |
| Cure time (mins.) | 60 | 60 | 60 |
| Modulus: | | | |
| (a) At 100% elongation | 20.3 | 16.5 | 17.5 |
| (b) At 300% elongation | 134 | 73.5 | 92 |
| Tensile strength | 226 | 228 | 220 |
| Elongation at break (percent) | 400 | 620 | 530 |

The modulus and tensile strength are each expressed in kilogrammes per square centimetre.

*Example IV*

This example illustrates the use of an amine carbamate as accelerator in the cure of a butadiene/acrylonitrile copolymer.

A polymeric composition was prepared from the following ingerdients:

| | Parts |
|---|---|
| Butadiene/acrylonitrile copolymer | 100 |
| Carbon black (H.A.F.) | 50 |
| Sulphur | 2 |
| Octylammonium octylcarbamate | 2 |

The ingredients were mixed on a two-roll mill and samples of the composition so obtained were cured at 140° C. for 60 minutes.

The cured sample had the following physical properties:

Modulus:
   (a) At 100% elongation _____ 39
   (b) At 300% elongation _____ 210
Tensile strength _____ 210
Elongation at break (percent) _____ 300

The modulus and tensile strength are each expressed in kilogrammes per square centimetre.

Having now described our invention, what we claim is:

1. A process for the production of a cured elastomer which comprises heating at least one synthetic elastomer selected from the class consisting of rubber-like butadiene/styrene and butadiene/acrylonitrile copolymers, cis- and trans-polybutadiene, trans-polyisoprene, copolymers of butadiene with unsaturated ketones, copolymers of butadiene with acrylates, copolymers of butadiene with substituted acrylates, polychlorobutadiene, chlorosulphonated polyethylenes, chlorine-containing copolymers of vinyl chloride with ethylene, and chlorine-containing copolymers of vinyl chloride with propylene, with sulphur as a curing agent and with, as accelerator, an aliphatic amine monocarbamate of the general formula

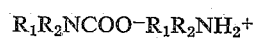

$$R_1R_2NCOO^-R_1R_2NH_2^+$$

wherein $R_1$ and $R_2$ each represent a member selected from the class consisting of alkyl groups, cycloalkyl groups and heterocyclic groups, and wherein $R_1$ can also represent a hydrogen atom.

2. A process according to claim 1 in which $R_1$ and $R_2$, when taken together, contain from 6 to 40 carbon atoms.

3. A process according to claim 1 in which the amount of sulphur is 1 to 5 parts by weight per 100 parts by weight of said elastomer.

4. A process according to claim 1 in which the amount of the aliphatic amine carbamate is 0.25 to 5 parts by weight per 100 parts by weight of said elastomer.

5. A process according to claim 1 in which the elastomer is heated to a temperature of 100° C. to 200° C., until the elastomer is cured.

6. A process according to claim 5 in which said temperature is 130° C. to 150° C.

References Cited by the Examiner

UNITED STATES PATENTS

| | | | |
|---|---|---|---|
| 2,623,024 | 12/52 | Barton | 260—5 |
| 2,657,190 | 10/53 | Banes et al. | 260—79.5 |

FOREIGN PATENTS 415,790  9/34  Great Britain.

OTHER REFERENCES

Breckley: "India Rubber World," 114, pp. 663–5 (1946).

MURRAY TILLMAN, *Primary Examiner.*

LEON J. BERCOVITZ, *Examiner.*